US009690166B1

(12) United States Patent
Sanders

(10) Patent No.: US 9,690,166 B1
(45) Date of Patent: Jun. 27, 2017

(54) APPARATUS FOR MOUNTING A CAMERA ON A PERSON

(71) Applicant: Jeff Sanders, Ojai, CA (US)

(72) Inventor: Jeff Sanders, Ojai, CA (US)

(\*) Notice: Subject to any disclaimer, the term of this patent is extended or adjusted under 35 U.S.C. 154(b) by 0 days.

(21) Appl. No.: 15/478,988

(22) Filed: Apr. 4, 2017

Related U.S. Application Data

(60) Provisional application No. 62/320,018, filed on Apr. 8, 2016.

(51) Int. Cl.
| G03B 3/00 | (2006.01) |
| G03B 17/56 | (2006.01) |
| A45F 3/14 | (2006.01) |
| A45F 5/00 | (2006.01) |
| F16M 13/04 | (2006.01) |
| G03B 3/12 | (2006.01) |

(52) U.S. Cl.
CPC ............... *G03B 3/12* (2013.01); *A45F 3/14* (2013.01); *A45F 5/00* (2013.01); *F16M 13/04* (2013.01); *G03B 3/00* (2013.01); *G03B 17/561* (2013.01); *G03B 17/563* (2013.01); *A45F 2003/144* (2013.01); *A45F 2003/146* (2013.01)

(58) Field of Classification Search
None
See application file for complete search history.

(56) References Cited

U.S. PATENT DOCUMENTS

| 2,746,369 | A | * | 5/1956 | Bruce | F16M 13/04 224/265 |
| 3,324,781 | A | * | 6/1967 | Clos | G03B 3/00 359/506 |
| 4,298,149 | A | * | 11/1981 | Gottschalk | A45F 3/10 224/201 |
| 5,612,756 | A | * | 3/1997 | Kardach | F16M 13/04 396/422 |
| 6,056,449 | A | * | 5/2000 | Hart | F16M 13/04 396/421 |

(Continued)

*Primary Examiner* — W B Perkey

(57) ABSTRACT

An apparatus that is wearable by a solo video camera man that allows for solo focusing of subjects without the need for a "focus follow" The device allows for one operator to work the camera and focus it without touching the lens through one hand operation of the lens. There is silent operation for sound recording while filming. The device is modifiable for left hand or right hand use. The device is foldable for portability. The device provides a stable platform for portable camera operation. There is adjustable focus tension for micro control and operator preference. There is an add-on surround frame to support sound and lighting equipment that moves with the camera and that can also house a monitor. The system includes a vest and adjustable support strut that makes hands-free use fatigue-free between scenes. A scale linked to the lens focus makes pre-set focus points easy to mark and visually reference by the single operator. The unit can be tripod mounted for stationary filming. The fold down back stop is adjustable in and back along the shoulder support bars to provide repeatable eye relief to camera or affixed monitor. The back stop and shoulder supports provide a gripping, tacky surface for stability. There is a direct mechanical link between the control handle and the lens focus and no cables or gears with backlash or slippage.

10 Claims, 6 Drawing Sheets

(56) References Cited

U.S. PATENT DOCUMENTS

| | | | | |
|---|---|---|---|---|
| 7,191,923 | B1* | 3/2007 | Kundig | F16M 11/08 |
| | | | | 224/257 |
| 2010/0006611 | A1* | 1/2010 | Knowles | A45F 3/14 |
| | | | | 224/257 |
| 2010/0266270 | A1* | 10/2010 | Pizzo | G03B 17/00 |
| | | | | 396/420 |
| 2014/0099092 | A1* | 4/2014 | Di Leo | G03B 17/563 |
| | | | | 396/420 |
| 2016/0209732 | A1* | 7/2016 | Liang | G03B 17/563 |
| 2016/0259228 | A1* | 9/2016 | Hellsten | F16M 11/046 |

\* cited by examiner

APPARATUS FOR MOUNTING A CAMERA ON A PERSON

REFERENCE TO PRIOR APPLICATION

This application claims priority of the provisional patent application 62/320,018, filed Apr. 8, 2016 entitled APPARATUS FOR MOUNTING A CAMERA ON A PESON(sic) by Jeff Sanders.

BACKGROUND OF THE INVENTION

Field of the Invention

The present invention relates to the field of video recording devices and more particularly toward an apparatus that allows for solo filming using a video camera with a shoulder mounted apparatus that allows for the user to focus the camera as needed without the aid of a second person.

Description of the Prior Art

In the field of photography, there is a sub-field of videography wherein video or moving pictures are captured by a camera. When making videography typically not only images are desired to be captured, but sound as well. Further, when filming videographically, the action captured and the actual filming involve movement. Because of this movement, refocusing of the camera is an ongoing need.

Typically, in the past, the video camera is held by both hands of the videographer in moving environments. The videographer's hands are occupied carrying the camera so any other functions, such as focusing, need to be accomplished by a second person, referred to as the "focus follow". The inclusion of this second person can significantly increase the production costs of video production and is often a barrier for the young and just-starting-out videographer.

Additionally, there are prior art devices that include electric motors and button switches to focus an attached video camera. These devices have the drawback of the electric motors introducing a hum sound into the recording. Because of this, a separate sound man is required.

It is the object of the instant invention to provide a system and apparatus that allows a video camera to be mounted easily and comfortably onto the shoulders of a human that also allows said human to have his or her hand's free and available to adjust the focus, and/or to add sound, lighting and any other options to the production of the video.

It is yet another object of the invention to allow for the focus of video camera without the use of electric motors that introduce sound that has to be edited out by a separate sound man.

SUMMARY OF THE INVENTION

The basic embodiment of the present invention teaches an apparatus for a solo operator to video record a subject comprising: a frame having a bottom horizontal member, a first shoulder arm extending outwardly in the same plane as said bottom horizontal member and, a second shoulder arm extending outwardly in the same plane as said bottom horizontal member said second shoulder arm being substantially parallel with said first shoulder arm; a pair of handles extending downward from said frame, said pair of handles being substantially L-shaped and being positioned on opposite sides of said bottom horizontal member, said pair of handles being positioned in the opposite direction from said first and second shoulder arms wherein one of said pair of handles is attached to a focusing apparatus said focusing apparatus further comprising: a planar member that is axially rotatable that is perpendicular to one of said pair of handles wherein said planar member is in communication with said one of said pair of handles; a first vertical lever attached to said planar member terminating in a first joint: a second horizontal lever attached to said first joint and terminating in a second joint; a support base attached to second joint that is in communication with a camera lens, said camera lens being part of a video camera that is attached to said bottom horizontal member of said frame wherein when said one of said pair of handles is rotated in an axial direction, said planar member moves in said axial direction, thereby causing said camera lens to be moved to a desired position through the action of said first vertical lever and second horizontal lever; a vest to be worn by said solo operator, said vest further comprising: a first shoulder strap; a second shoulder strap; a waist strap; a chest plate situated between said first and second shoulder straps and said waist strap; a seat attached to said chest plate with a hollow cylindrical center; and a connecting bar with a first end that fits inside of said hollow cylindrical center of said seat and a second end that attaches to said bottom horizontal member of said frame.

The above embodiment can be further modified by defining that said first and second shoulder arms are asymmetrical in length and wherein said first and second shoulder arms have a first and second hinge positioned substantially in the center of said first and second shoulder arms, although offset asymmetrically to allow said first and second shoulder arms to fold over one on top of the other for storage and transport.

The above embodiment can be further modified by defining that a first and second stop are placed on said first and second shoulder arms proximate said first and second hinges to provide a resistance when said first and second shoulder arms are unfolded for use.

The above embodiment can be further modified by defining that a first and second shoulder pad is attached to said first and second shoulder arms.

The above embodiment can be further modified by defining that said first and second shoulder arms terminate in a first and second back stop that extends downward in a vertical direction from said first and second shoulder arms.

The above embodiment can be further modified by defining that an extending flange extends outward from said bottom horizontal member for attachment to said connecting member.

The above embodiment can be further modified by defining that a first and second vertical pin extends downward from said planar member to provide stops.

The above embodiment can be further modified by defining that a third vertical pin extends upward proximate said planar member to provide a sight.

The above embodiment can be further modified by defining that a flexible strap is attachable to said camera lens and held in place by a pair of pins The above embodiment can be further modified by defining that a first vertical member extends upward from said bottom horizontal member on one side and a second vertical member extends upward from said bottom horizontal member on the side opposite said first vertical member wherein said first vertical member and said second vertical member are parallel to each other and wherein a second horizontal bar connects said first vertical member and said second vertical member thereby creating a open square through which said camera is placed wherein said second horizontal bar has a groove found therein for the placement of filming accessories such as lighting and sound equipment and additional monitors.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
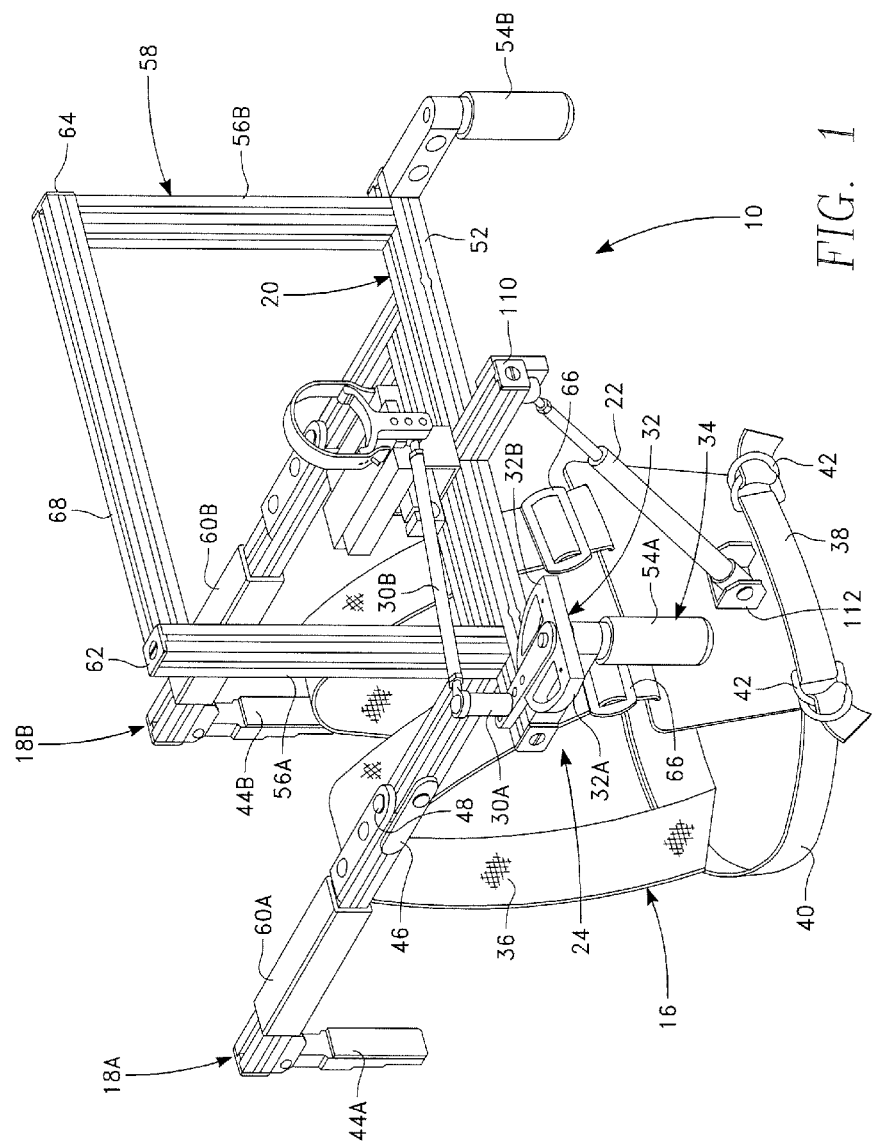
FIG. 1 is a perspective view of the device of the instant invention as it is to be mounted on the shoulders of a user, showing the optional upper frame.

Turning to the drawings, the preferred embodiment is illustrated and described by reference characters that denote similar elements throughout the several views of the instant invention.

Glossary

- 10 apparatus
- 12 camera
- 14 person/user
- 16 vest/harness
- 18A first support arm for shoulders
- 18B second support arm for shoulders
- 19A first shoulder arm part, asymmetrical for folding
- 19B second shoulder arm part, asymmetrical for folding
- 20 frame base (bottom only—no top)
- 22 connecting post
- 24 focusing apparatus
- 26 user hand
- 28 camera lens
- 30A vertical lever on focusing apparatus
- 30B horizontal lever on focusing apparatus
- 30C alternate embodiment larger vertical lever on focusing apparatus for larger camera
- 32 curved base (half circle)/disc
- 32A first side of dome on half circle
- 32B second side of dome on half circle
- 34 lens focus grip (specific one between 54A and 54B depending on handedness)
- 36 shoulder straps on vest/harness
- 38 chest plate on vest/harness
- 40 waist strap on vest/harness
- 42 D-rings on waist strap
- 44A $1^{st}$ back stop on first support arm for shoulders
- 44B $2^{nd}$ back stop on second support arm for shoulders
- 46 stop on shoulder arms
- 48 hinges on shoulder arms
- 50A $1^{st}$ pin for focusing
- 50B $2^{nd}$ pin for focusing
- 52 base of frame (no top, same as 20 but described separately)
- 54A first base handle
- 54B second base handle
- 56A first vertical side for optional upper frame
- 56B second vertical side for optional upper frame
- 58 upper frame—square
- 60A first shoulder pad
- 60B second shoulder pad
- 62 $1^{st}$ top corner of optional upper frame
- 64 $2^{nd}$ top corner of optional upper frame
- 66 buckles on shoulder straps
- 68 upper horizontal bar for optional accessories
- 70A first Heim joint
- 70B second Heim joint
- 72 adjustable rubber strap (over camera lens)
- 74A first securing pin for adjustable rubber strap
- 74B second securing pin for adjustable rubber strap
- 76 focusing support
- 78 camera base (purchased)
- 80 folded position (arrow direction)
- 82A first focus direction (arrow direction)
- 82B second focus direction (arrow direction)
- 84 blank surface for focus marks
- 86A first direction focusing lens (arrow direction)
- 86B second direction focusing lens (arrow direction)
- 88 twist direction on focusing handle (arrow direction)
- 90 larger camera for alternate embodiment
- 92 groove in 68 for attaching accessories
- 94 end cap for 68
- 96 screw in end cap
- 98 top securing member
- 100 washer for base for accessories
- 102 bolt for base for accessories
- 104 hole in end cap
- 106 hole in upper horizontal bar
- 108 slot for nut
- 110 protruding member on base (20) to attach to connecting post
- 112 seat for connecting post on vest/harness
- 114 reference pin (acts as sight)

The instant invention provides a system and apparatus 10 that allows for a mounting of a video camera 12 on single operator solo individual 14. The system in its simplest embodiment includes a vest/harness 16 that is worn by the user 14, two support arms 18A, 18B that rest on the user's 14 shoulders, a base frame 20 and a post 22 connecting the vest/harness 12 to the frame 20. Lighting and sound equipment (not shown) are attachable to the optional upper frame 58 allowing the solo operator 14 to manage these elements him or herself. A monitor can also be added to the optional upper frame 58 for ease of viewing as needed.

The primary benefit of the instant invention is the ability for the camera person 14 to be completely free of the need to employ a "focus follow" as described above. The camera 12 can be focused through the focusing apparatus 24 near where the hands of the user 12 are situated. The user 12 can turn the focusing apparatus 24 with just one hand 26 which connects to the camera lens 28 through a movable series of levers 30A, 30B. The focusing apparatus 24 includes a curved base 32 that can be marked for focus points prior to commencing filming.

The optional upper frame 58 can operate as a platform for all kinds of filming equipment, sound recording, lighting and has this function of allowing the user 12 to focus, record and light the subject alone. The frame is foldable and folds up like a pair of reading glasses. The lens 28 on the camera 12, that is mounted on the device 10 through a purchased base 78 is adjustable by the user 12 through the twisting the handle of the lens focus grip 54A, with either the left or right hand, without the need for the use of both hands. The non-twisting hand is left free to work as needed on other tasks.

The vest/harness 16 has three inch wide polyester strapping over each shoulder to create shoulder straps 36, a curved aluminum chest plate 38 that distributes the weight put on the device 10 and a one and half inch wide waist strap 40 that connects to pairs of D-rings 42 connected via hook and loop to the aluminum plate 38. There are rubber pads 60A, 60B on the shoulder braces 18A, 18B that grip the wearer 12 and make the camera platform 20 very stable. The user 12 is able to bend forward and walk down stairs without holding either handle 54A, 54B.

The twisting handle 34 can be placed on either side of the base 20, depending upon the handedness of the user 12, i.e., the left side or the right side. A white disc or similar blank surface 84 and pointer acting as a sight 114 on the focus control side can be marked with pre-set focus spots. A run-through of a scene will establish the focus points on the disc 84 so when the filming actually occurs, the points of focus are easily found and achieved through the twisting of the grip 34.

The device 10 in its simplest embodiment has a base frame 52 that makes a planar station for a camera 12 to be mounted on with a purchased base 78. This base frame 52 has extending downward from the base frame two handles 54A, 54B that the user 12 can grip. These handles 54A, 54B are offset away from the base 52 slightly to add stability. This base frame 52 is what folds up in like a pair of reading glasses. The optional upper frame 58 can be used to effectively place the video camera 12 behind a square 58. This square 58 is where sound equipment, lighting equipment and monitors can be added as needed or desired.

The advantages of the device are as follows: It allows for one operator to work the camera and focus it without touching the lens. There is one hand operation of the lens. There is silent operation for sound recording while filming. The device is modifiable for left hand or right hand use. The device is foldable for portability. The device provides a stable platform for portable camera operation. There is adjustable focus tension for micro control and operator preference. There is an add-on surround frame to support sound and lighting equipment that moves with the camera and that can also house a monitor. The system includes a vest and adjustable support strut that makes hands-free use fatigue-free between scenes. A scale linked to the lens focus makes pre-set focus points easy to mark and visually reference by the single operator. The unit can be tripod mounted for stationary filming. The fold down back stop is adjustable in and back along the shoulder support bars to provide repeatable eye relief to camera or affixed monitor. The back stop and shoulder supports provide a gripping, tacky surface for stability. There is a direct mechanical link between the control handle and the lens focus and no cables or gears with backlash or slippage.

Going through the figures, the operation of the apparatus is described with reference to the various elements and their operations. The user 12 first attaches the vest/harness 16 to his body by placing the shoulder straps 36 over his shoulders and situating the chest plate 38 near the solar plexus. There is a seat 112 attached to the chest plate 38 that has a cylindrical sleeve with o-rings placed inside that allows the cylindrical sleeve to positioned in an upward and angled direction when placing the vest/harness 16 on the body of the human 12 and holding its position. The straps 36 are adjusted with buckles 66. Then the waist strap 40 wraps around the waist of the user and is secured in place through the D-rings 42 found at the termination points of the waist strap 40.

Once the vest/harness 16 is on the user 12 and the cylindrical sleeve of the seat 112 is positioned to receive the connecting post 22, the connecting post 22 is placed inside of the cylindrical sleeve at one end. The other end of the connecting post 22 has a ball joint that fits into the fitting 110 extending outward from the frame base 52 of the device 10 situated substantially in the center of the base 52. The base 52 is then unfolded from the resting eyeglass position. The shoulder arms 18A, 18B are asymmetrical in length with one side 19A being longer than the other side 19B to allow for folding into itself like a pair of eyeglasses 80 when not in use. Each arm 18A, 18B has near the midpoint a hinge 48 where it bends and a stop 46 to allow for a termination point when the arms 18A, 18B are opened up for use. At the rear end of each arm 18A, 18B are a pair of shoulder pads 60A, 60B that are adjustable in length with regard to the back stops 44A, 44B that terminate at the end of each arm 18A, 18B and rest behind the shoulders of the user 12.

Once the frame 52 is on the shoulders of the user 12 one of the gripping handles 54A, 54B is usable as the focusing grip 34 depending upon the handedness of the user. A left handed user 12 will have the focusing apparatus 24 on the left side and a right handed user 12 will have the focusing apparatus 24 on the right side. The focusing handle is referred to as 34 to cover both scenarios. An optional upper frame 58 extends upward from the base 52, if desired, for the mounting thereon of optional accessories.

The purchased video camera base 78 is placed in the center of the bottom frame 52 for use. The camera lens 28 has wrapped around it a strap 72 that is adjustable and that is held in place with a pair of pins 74A, 74B. The camera 12 and the base 78 are situated approximately above the extending portion 110 that attaches to the connecting post 22. The focusing handle 34 can turn about 180 degrees, 90 degrees in either direction 82A, 82B. The twisting handle 34 has a vertical axis around which it spins. This vertical axis extends upward into a vertical lever 30A that terminates in a first Heim joint 70A. At the first Heim joint 70A a second horizontal lever 30B extends from the first Heim joint 70A to a second Heim joint 70B that is attached to a support 76 that then turns the camera lens 28 as desired.

Between the twisting handle 34 and the vertical lever 30A is a horizontal half-circle 32 having two sides 32A, 32B that turn in either direction 82A, 82B to focus the lens. A pair of hanging flanges 50A, 50B extend downward from the horizontal half-circle 32 to provide stopping points for the disc 32 as it turns into focus position. Between the base 52 and the disc 32 is a platform that has extending upward therefrom a focusing pin 114 that acts as sight that allows for the user 12 to find the spot to focus and where the disc 32 needs to be turned to focus on that point. The disc 32 provides a surface 84 upon which focusing marks can be made at the walk-through stage where the focus points are set and before filming actually commences.

Figure 2:
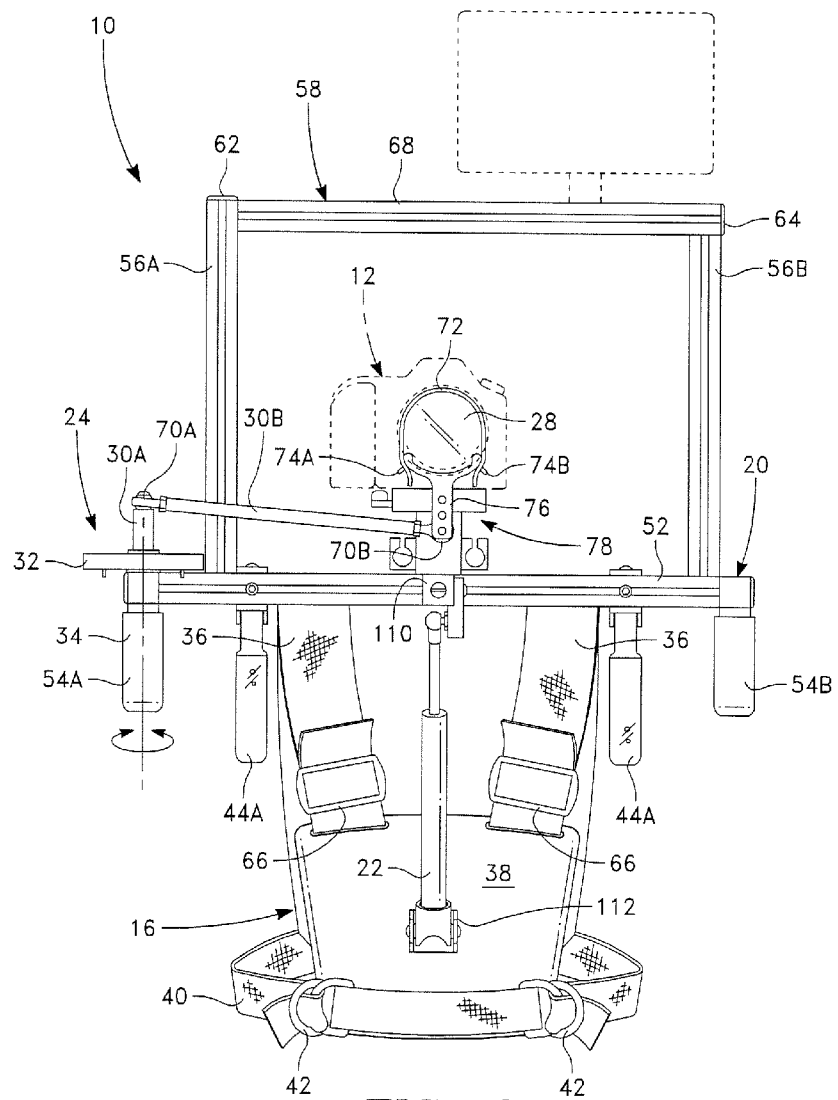
FIG. 2 is a front view of the device of the instant invention as it is to be mounted on the shoulders of a user, showing the optional upper frame.
Figure 3:
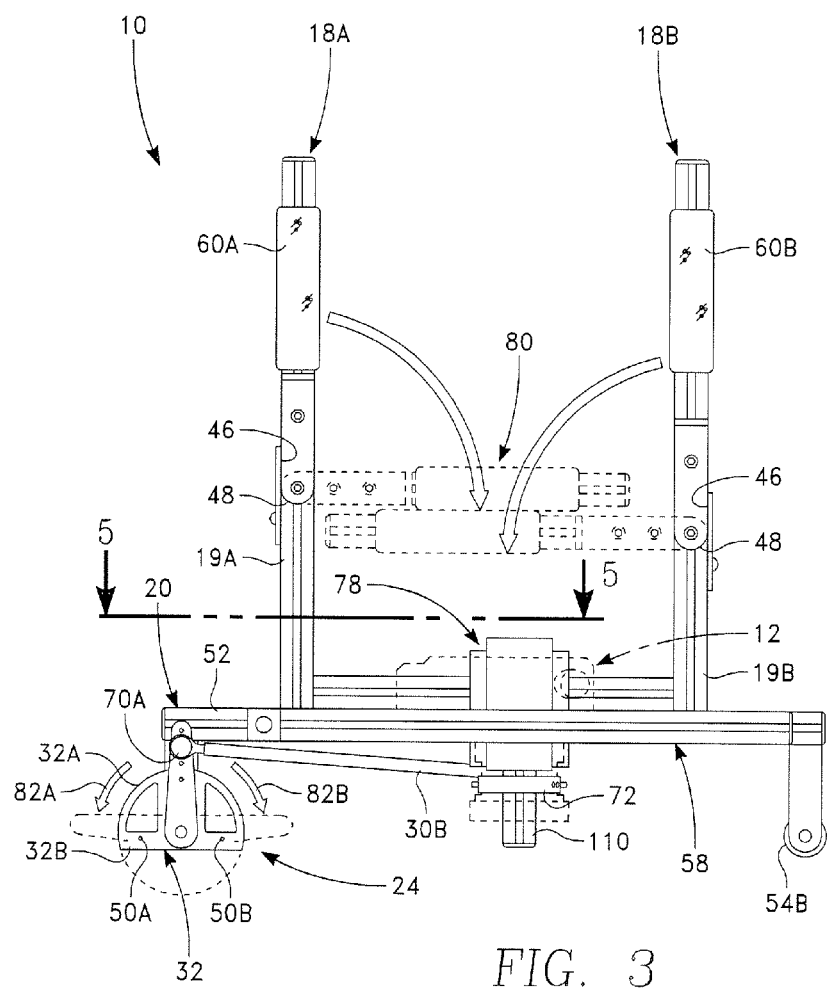
FIG. 3 is a top view of the device of the instant invention as it is to be mounted on the shoulders of a user.
Figure 4:
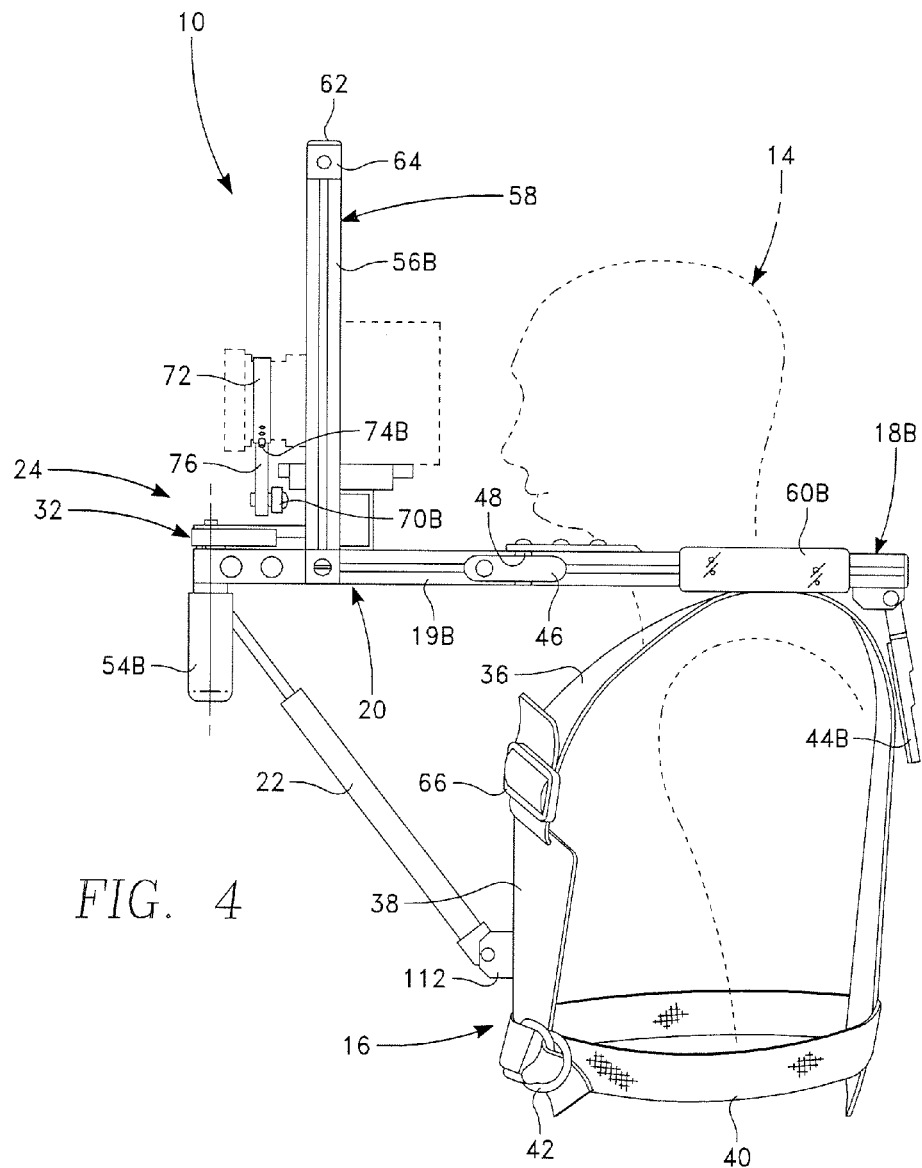
FIG. 4 is a side view of the device of the instant invention as it is to be mounted on the shoulder of a user, showing the optional upper frame.
Figure 5:
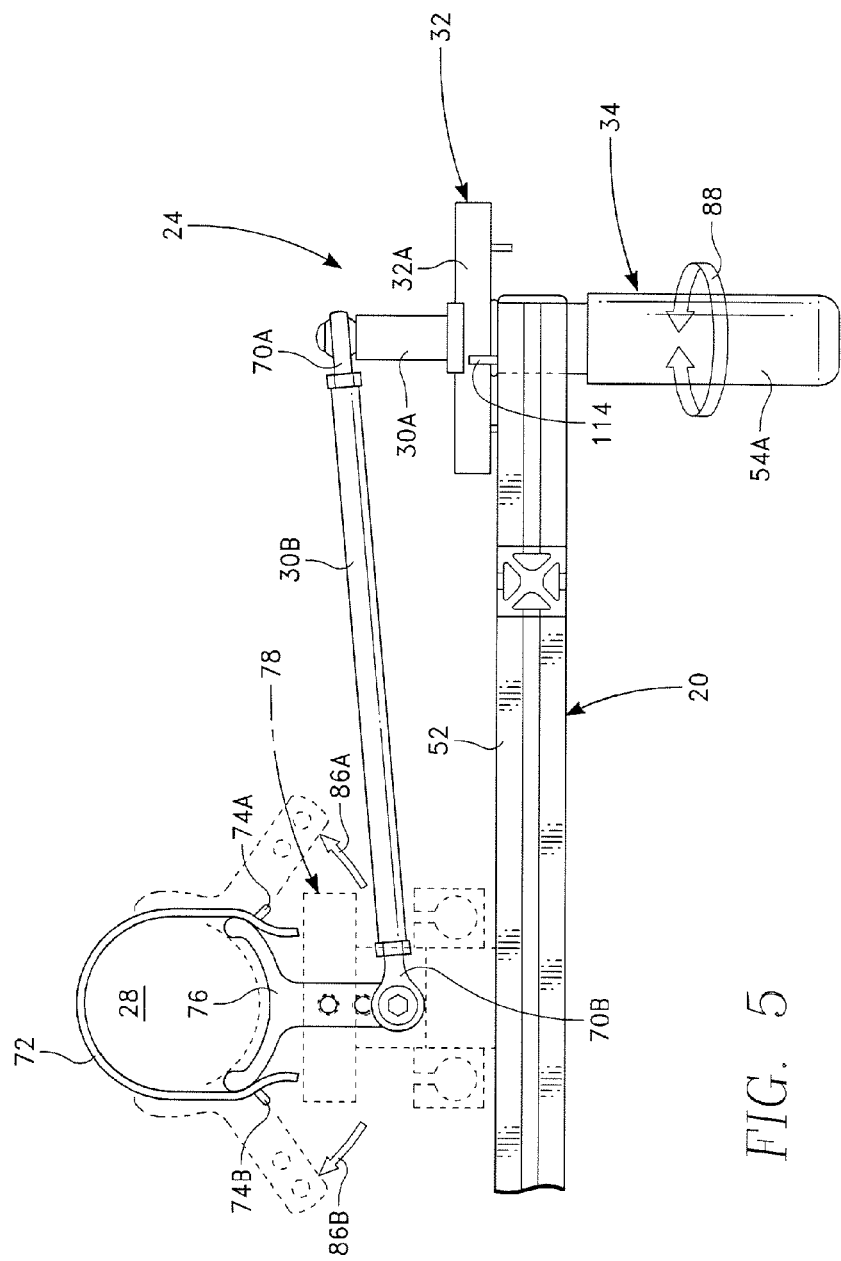
FIG. 5 is a close up view of the focusing portion of the device of the instant invention as taken along line 5-5 in FIG. 3.
Figure 6:
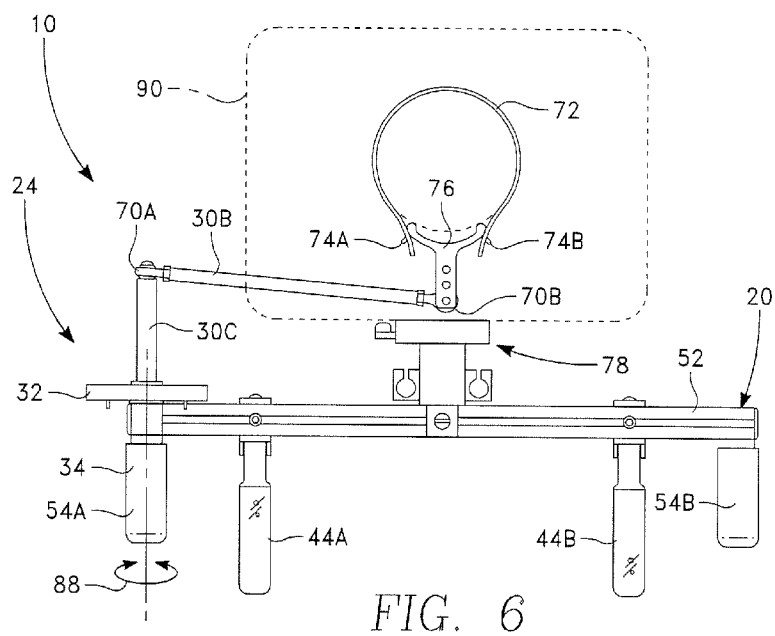
FIG. 6 is a view similar to FIG. 2 but shown with an alternate sized camera and alternate size vertical bar on the focusing portion of the device of the instant invention.

FIG. 5 shows the focusing apparatus 24 in detail and it is shown how when the twisting handle 34 is turned in an axial direction 88 this causes the vertical lever 30A to turn in that same direction 82A, 82B, activating the first Heim joint 70A which then activates the horizontal lever 30B activating the second Heim joint 70B which in turn moves the lens support 76 as desired in the proper focusing direction 86A, 86B. FIG. 6 shows a similar view as FIG. 2 but with a larger vertical lever 30C for a larger camera 90 as desired.

Figure 7:
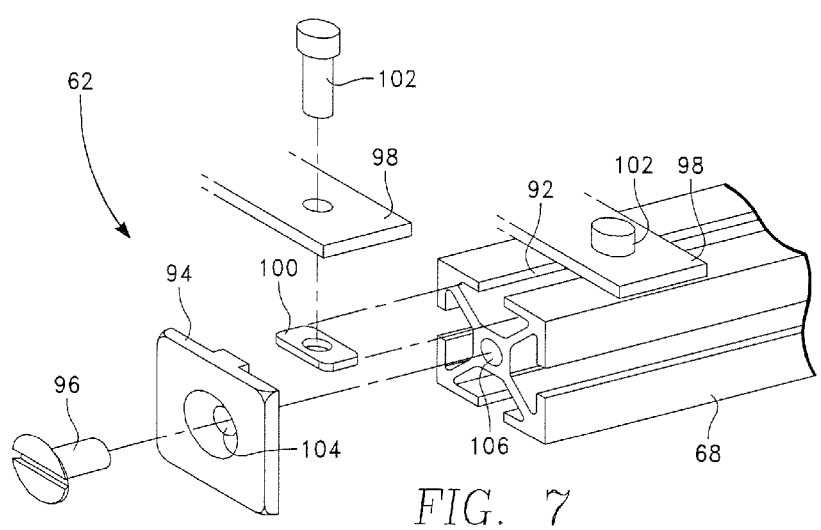
FIG. 7 is a close up view of one of the corners of the top portion of the optional upper frame as it allows for the attachment thereto of recording accessories.

The optional upper frame 58 includes a first vertical member 56A and a second vertical member 56B which are parallel to each other and extend upward from the base 52. The first vertical member 56A terminates in a first top corner 62 and the second vertical member 56B terminates in a second top corner 64. A connecting horizontal member 68 connects these two corners 62, 64 creating a square 58. FIG. 7 shows a close up view of the first corner 62 of the connecting horizontal member 68 but also applies to the second corner 64. The connecting horizontal member 68 has a groove 92 along its length allowing for the placement in this groove 92 of desired accessories. To use, the end cap 94 with a hole therethrough 104 is removed from the corner 62 by unscrewing the screw 96. A top securing piece 98 and its screw 102 and washer 100 are likewise removed. A slot 108 in the upper horizontal bar 68 allows for the placement therein of the washer 100 to secure the top securing piece 98. A hole 106 in the horizontal connecting member 68 allows for the securing of the end cap 94 with the screw 96. The end cap 94 is removed and the top securing member 98 is removed and accessories can be slid into place into the groove 92 and then secured back into place with the top securing member 98 and the end cap 94.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. An apparatus for a solo operator to video record a subject comprising:
   a frame having a bottom horizontal member, a first shoulder arm extending outwardly in the same plane as said bottom horizontal member and, a second shoulder arm extending outwardly in the same plane as said bottom horizontal member said second shoulder arm being substantially parallel with said first shoulder arm;
   a pair of handles extending downward from said frame, said pair of handles being substantially L-shaped and being positioned on opposite sides of said bottom horizontal member, said pair of handles being positioned in the opposite direction from said first and second shoulder arms wherein one of said pair of handles is attached to a focusing apparatus said focusing apparatus further comprising:
      a planar member that is axially rotatable that is perpendicular to one of said pair of handles wherein said planar member is in communication with said one of said pair of handles;
      a first vertical lever attached to said planar member terminating in a first joint:
      a second horizontal lever attached to said first joint and terminating in a second joint;
      a support base attached to second joint that is in communication with a camera lens, said camera lens being part of a video camera that is attached to said bottom horizontal member of said frame wherein when said one of said pair of handles is rotated in an axial direction, said planar member moves in said axial direction, thereby causing said camera lens to be moved to a desired position through the action of said first vertical lever and second horizontal lever;
   a vest to be worn by said solo operator, said vest further comprising:
      a first shoulder strap;
      a second shoulder strap;
      a waist strap;
      a chest plate situated between said first and second shoulder straps and said waist strap;
      a seat attached to said chest plate with a hollow cylindrical center; and
   a connecting bar with a first end that fits inside of said hollow cylindrical center of said seat and a second end that attaches to said bottom horizontal member of said frame.

2. The apparatus as defined in claim 1 wherein said first and second shoulder arms are asymmetrical in length and wherein said first and second shoulder arms have a first and second hinge positioned substantially in the center of said first and second shoulder arms, although offset asymmetrically to allow said first and second shoulder arms to fold over one on top of the other for storage and transport.

3. The apparatus as defined in claim 2 wherein a first and second stop are placed on said first and second shoulder arms proximate said first and second hinges to provide a resistance when said first and second shoulder arms are unfolded for use.

4. The apparatus as defined in claim 1 wherein a first and second shoulder pad is attached to said first and second shoulder arms.

5. The apparatus as defined in claim 1 wherein said first and second shoulder arms terminate in a first and second back stop that extends downward in a vertical direction from said first and second shoulder arms.

6. The apparatus as defined in claim 1 wherein an extending flange extends outward from said bottom horizontal member for attachment to said connecting member.

7. The apparatus as defined in claim 1 wherein a first and second vertical pin extends downward from said planar member to provide stops.

8. The apparatus as defined in claim 1 wherein a third vertical pin extends upward proximate said planar member to provide a sight.

9. The apparatus as defined in claim 1 wherein a flexible strap is attachable to said camera lens and held in place by a pair of pins.

10. The apparatus as defined in claim 1 wherein a first vertical member extends upward from said bottom horizontal member on one side and a second vertical member extends upward from said bottom horizontal member on the side opposite said first vertical member wherein said first vertical member and said second vertical member are parallel to each other and wherein a second horizontal bar connects said first vertical member and said second vertical member thereby creating a open square through which said camera is placed wherein said second horizontal bar has a groove found therein for the placement of filming accessories such as lighting and sound equipment and additional monitors.

* * * * *